No Printed Specification Available
9840X
M. M. Marshall,
Straw Cutter.
Patented July 1. 1836.
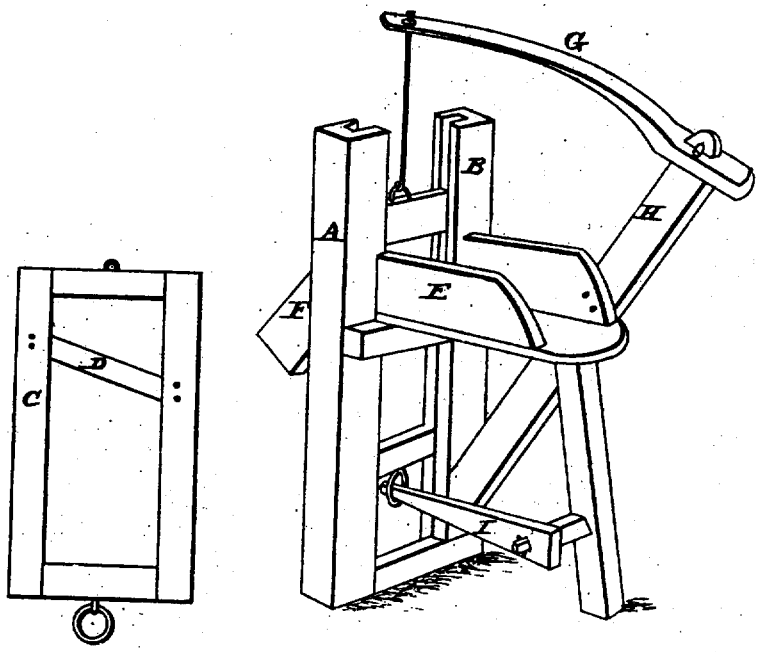

9840x July 1, 1836 4.

Mallory M Marshall. Smithfield Virginia

Letters Patent

The Schedule referred to in these Letters Patent and making part of the
same containing a description in the words of the said Mallory M Marshall
himself of his improvement in the machine for cutting Straw & Stalks Be it known that I Mallory M Marshall of Smithfield in the County
of the Isle of Wight and State of Virginia have invented a new and useful im
provement in the machine for cutting Straw and Stalks which is described
as follows. reference being had to the annexed drawings of the same ma
king part of this specification — This machine consists of two posts
A.B. placed apart the distance of the width of the gate and are framed to
gether. On the inside of which posts are cut grooves or [illegible] in which
the Gate slides up and down — The Gate C consists of four pieces of tim
ber framed together forming a rectangular frame. across which in an
oblique position is fastened a cast steel knife D. for cutting the straw.
The cutting Box E is placed in a horizontal position in the rear of the
posts. and is faced with iron. An inclined spout F to conduct
the cut straw in front of the machine is let into the front of the posts.
To the top of the gate is attached by a chain or cord a spring G. for
drawing up the Gate. which spring is fastened to an oblique stand
ard H framed to the posts. To the bottom of the gate is attached a
treadle I. worked by the foot of the operator — The operator takes a
bundle of straw in his right hand and brings it under the knife. he
then with his foot bears down upon the treadle and forces down the gate
and knife which cuts the straw. he then raises his foot and the
Spring instantly draws up the Gate and knife ready for another cut
which is made in a similar manner — What I claim as my invention
and which I desire to secure by Letters Patent consists in the before described ma
chine for cutting Straw Witnesses
William [illegible] Elliott
Wm [illegible]

Mallory M Marshall (344 words)